United States Patent [19]

Kim

[11] Patent Number: 5,459,413
[45] Date of Patent: Oct. 17, 1995

[54] BUS INTERFACING CIRCUIT FOR A FIFO MEMORY

[75] Inventor: Sang H. Kim, Seoul, Rep. of Korea

[73] Assignee: Goldstar Electron Co., Ltd., Choongchungbook, Rep. of Korea

[21] Appl. No.: 329,953

[22] Filed: Oct. 27, 1994

[30] Foreign Application Priority Data

Feb. 4, 1994 [KR] Rep. of Korea ............... 2111/1994

[51] Int. Cl.$^6$ ............... H03K 19/0175; G11C 7/00
[52] U.S. Cl. ............... 326/86; 365/189.05; 365/240; 326/90
[58] Field of Search ............... 326/86, 90, 95; 365/189.05, 240, 189.12

[56] References Cited

U.S. PATENT DOCUMENTS

| | | | |
|---|---|---|---|
| 4,315,167 | 2/1982 | Pelc | 326/90 |
| 4,433,394 | 2/1984 | Torii et al. | 365/189 |
| 4,873,667 | 10/1989 | Geadah et al. | 365/189.07 |
| 5,056,005 | 10/1991 | Kaneko et al. | 365/189 |
| 5,151,615 | 9/1992 | Egawa | 326/90 |
| 5,195,055 | 3/1993 | Mizuoka et al. | 365/189 |
| 5,200,925 | 4/1993 | Morooka | 365/240 |
| 5,248,908 | 9/1993 | Kimura | 326/86 |
| 5,396,460 | 3/1995 | Harada et al. | 365/240 |

*Primary Examiner*—Edward P. Westin
*Assistant Examiner*—Richard Roseen
*Attorney, Agent, or Firm*—Lowe, Price, LeBlanc & Becker

[57] ABSTRACT

A bus interfacing circuit for permitting a unilateral read/write first-in first-out memory to perform first-in first-out functions without data bumping when operated in bilateral data buses is disclosed. The bus interfacing circuit includes a first OR-logic gate for operating upon a host write signal and a peripheral write signal applied thereto, a second OR logic gate for operating upon a host read signal and a peripheral read signal applied thereto, a first-in first-out memory cell for accessing data in response to output signals from the first and second OR logic gates, a data propagation director for generating a first direction signal and a second direction signal in accordance with a generation order between the host and peripheral write signals, a first data switch for transferring data fed in a host data input terminal to said first-in first-out memory cell in response to said first direction signal, a second data switch for transferring data applied from the first-in first-out memory cell to a data bus in response to the host read signal, and a third data switch for transferring data loaded on the data bus to the first-in first-out memory cell.

2 Claims, 4 Drawing Sheets

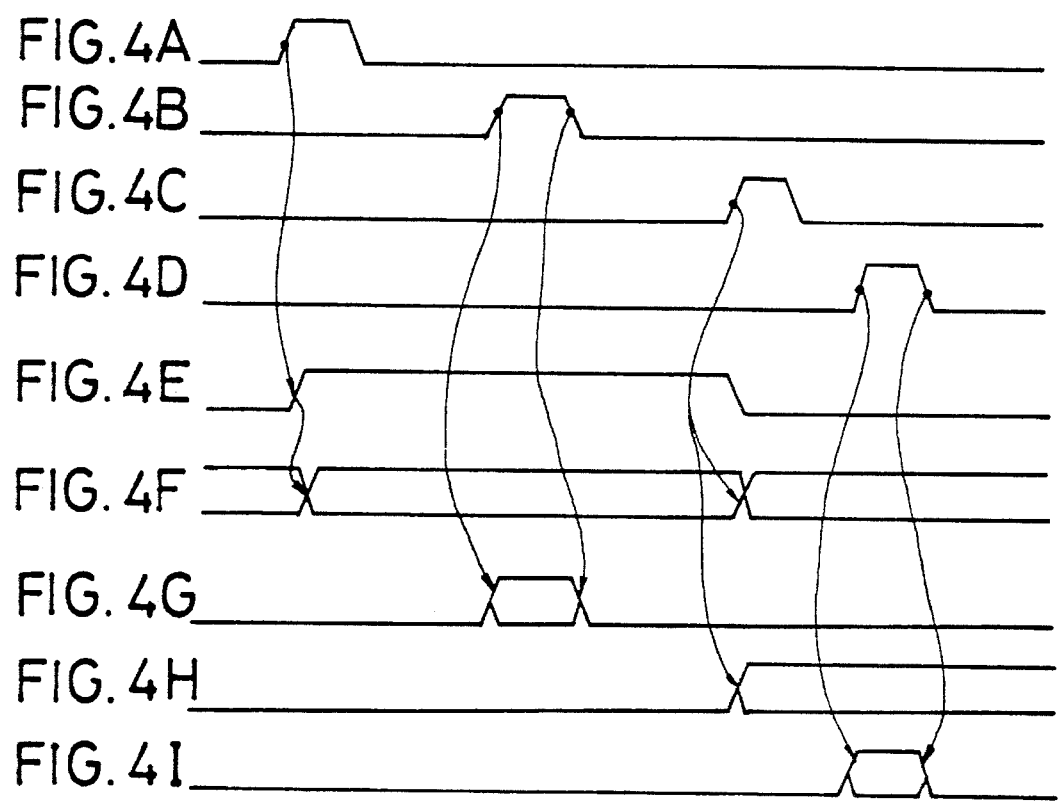

BUS INTERFACING CIRCUIT FOR A FIFO MEMORY

BACKGROUND OF THE INVENTION

1. Field of the Invention

The present invention relates to a bus interfacing circuit for a FIFO (first-in first-out) memory, and more particularly to a bus interfacing circuit for permitting a unilateral read/write FIFO memory to perform FIFO functions without a data bumping occurring when operated in bilateral data buses.

2. Description of the Conventional Art

FIG. 1 shows a conventional circuit for controlling a FIFO memory, consisting of a first and second ripple counter 1, 2 for respectively counting the numbers of bits belonging to a write signal and a read signal, a subtracter 3 for generating a difference between the counting values generating from the counters 1, 2, a decoder 4 for decoding an output signal of the subtracter 3 in accordance with the write signal and thereby generating a write enable signal and a read enable signal which are each of 16 bits, a comparator 5 for comparing the output signal of the subtracter 3 with a predetermined threshold level and thereby generating an empty signal or a full signal, a FIFO memory cell 6 for performing the FIFO function in response to the write and read enable signals generated from the decoder 4.

After initiating, an output value of 4 bits from the first ripple counter 1 is incremented in response to the rising of the write signal, simultaneously with an increment of an output value of 4 bits from the second ripple counter 2 in response to the read signal. Then, the subtracter 3 is activated to perform the subtracting function upon the counted signals so as to generate the difference between the counted write and read signals. The output signal of the subtracter 3 is compared with the threshold level in the comparator 5.

Up to this point, the comparator generates the empty signal until the voltage level of the output signal from the subtracter 3 becomes equal to the threshold level, all upon becoming equal to the threshold level the full signal is generated therefrom.

On the other hand, the output signal of the subtracter 3 is applied to the decoder 4 and synchronized with the write signal so that the write and read enable signals of 16 bits are generated therefrom to control the FIFO memory cell 6. At this point, since the FIFO memory cell 6 performs its access operation within a fixed address without moving the write and read points, it is possible to carry out the FIFO function by the corresponding write and read enable signals.

However, it may be anticipated that since the conventional circuit utilizes an architecture of the unilateral data bus, data bumping would occur in a dual data bus system. Furthermore, such a conventional circuit as shown in FIG. 1 must include means for controlling the external write and read signals so as to allow it to share a single memory unit.

SUMMERY OF THE INVENTION

Accordingly, it is an object of the present invention to provide a bus interfacing circuit for permitting a unilateral read/write FIFO memory to perform FIFO functions without data bumping when operated in bilateral data buses.

To achieve this and other objects, a bus interfacing circuit of the present invention includes a first OR-logic gate for operating upon a host write signal and a peripheral write signal input thereto, a second OR logic gate for operating upon a host read signal and a peripheral read signal input thereto, a first-in first-out memory cell for accessing data in response to output signals from the first and second OR logic gates, a data propagation director for generating a first direction signal and a second direction signal in accordance with a generation order between the write signals, a first data switch for transferring data fed in a host data input terminal to the first-in first-out memory cell in response to the first direction signal, a second data switch for transferring data applied from the first-in first-out memory cell to a data bus in response to the host read signal, and a third data switch for transferring data loaded on the data bus to the first-in first-out memory cell.

BRIEF DESCRIPTION OF THE DRAWINGS

Further objects and advantages of the present invention will be apparent from the following description, reference being had to the accompanying drawings wherein preferred embodiments of the present invention are clearly shown.

FIG. 4A through 4I show operating signal wave forms of the circuit elements in the bus interfacing circuit of FIG. 2, respectively.

DETAILED DESCRIPTION OF THE INVENTION

The techniques disclosed in this detailed description of the present invention are exemplary only and it should be clear to one skilled in the art that alternate techniques may be employed in practicing this invention.

Figure 1:
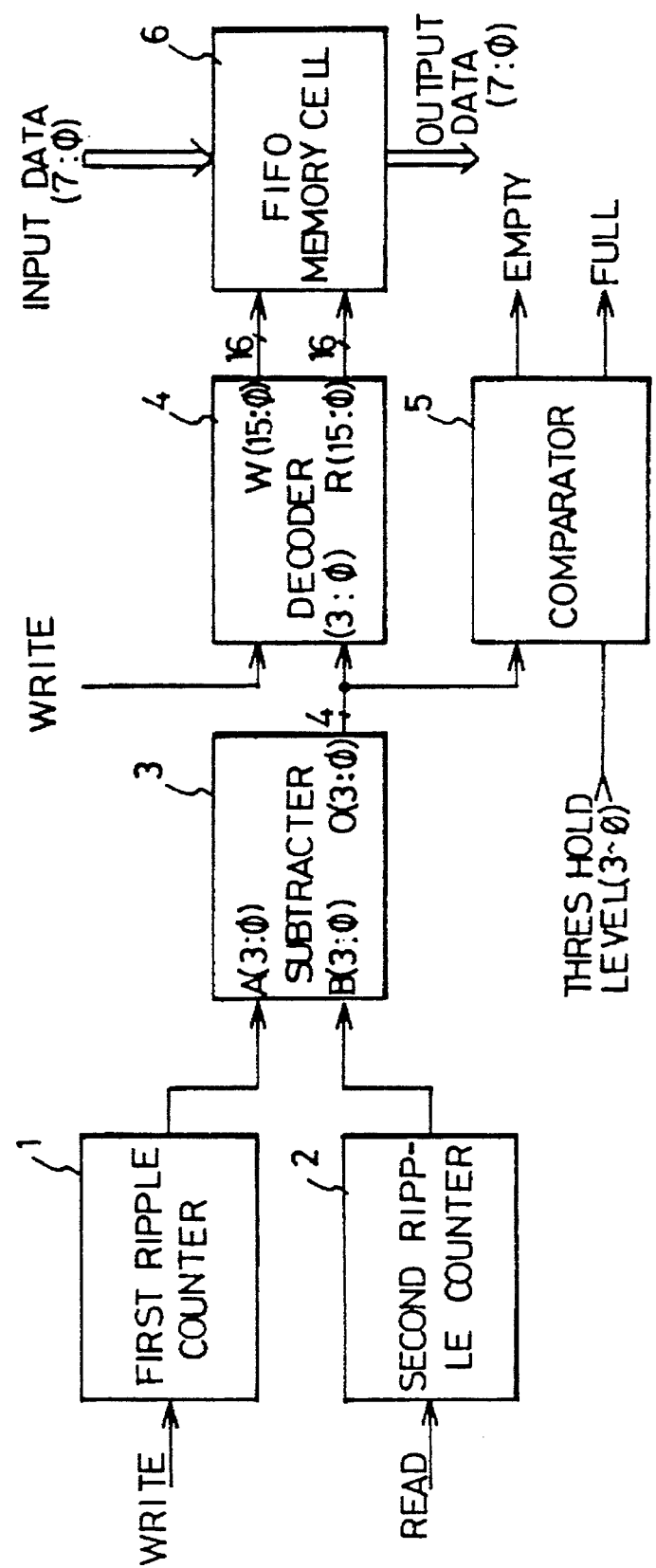
FIG. 1 is a functional block diagram of a conventional bus interfacing circuit for a FIFO memory.
Figure 2:
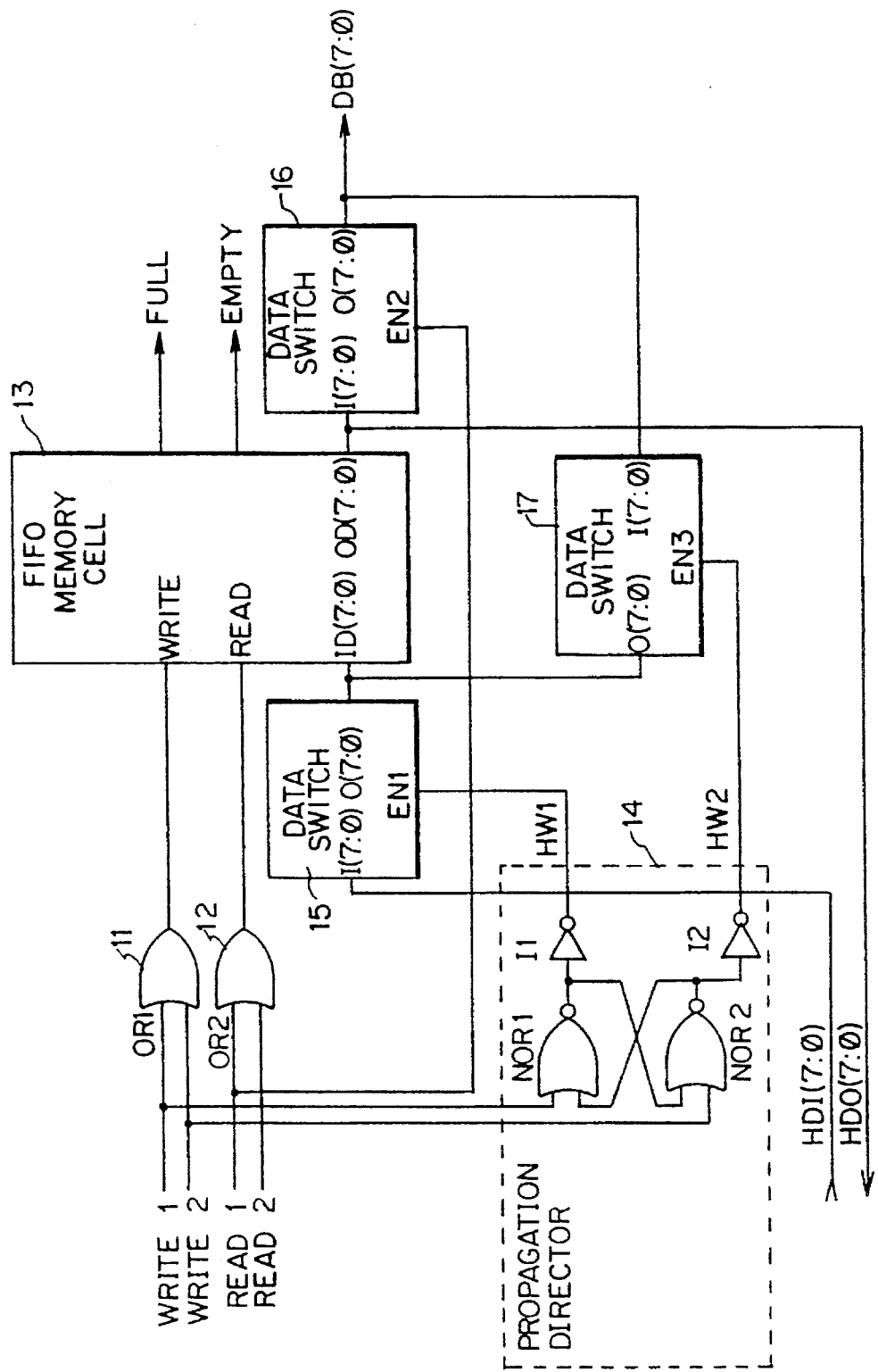
FIG. 2 is a functional block diagram of a bus interfacing circuit according to the present invention.

Referring to FIG. 2, a bus interfacing circuit of the present invention includes a first OR-logic gate 11 for operating upon a host write signal WRITE1 and peripheral write signal WRITE2 input thereto, a second OR logic gate 12 for operating upon a host read signal READ1 and peripheral read signal READ2 input thereto, a FIFO memory cell 13 for accessing data through an input terminal ID and output terminal OD in response to output signals from the OR logic gates 11, 12, a data propagation director 14 for generating direction signals HW1 and HW2 in accordance with a generation order between the write signals WRITE1 and WRITE2, a first data switch 15 for transferring data fed in a host data input terminal HDI to the input terminal ID of the FIFO memory cell 13 in response to the direction signal HW1, a second data switch 16 for transferring data applied from the output terminal OD of the FIFO memory cell 13 to a data bus DB in response to the host read signal READ1, a third data switch for transferring data loaded on the data bus DB to the input terminal ID so as to make the data appear at a host data output terminal HDO of the FIFO memory cell 13.

The data propagation director 14 consists of NOR logic gates NOR1 and NOR2 respectively receiving the host write signal WRITE1 and the peripheral write signal WRITE2. The rest input terminal of the NOR logic gate NOR1 is coupled to an output terminal of the NOR logic gate NOR2 which is coupled to an inverter I2. The rest input terminal of the NOR logic gate NOR2 is coupled to an output terminal of the NOR logic gate NOR1 which is coupled to an inverter I1. Output terminals of the inverters I1 and I2 are respectively coupled to enable terminals EN1, EN2 of the first and second data switches 15 and 16.

Figure 3:
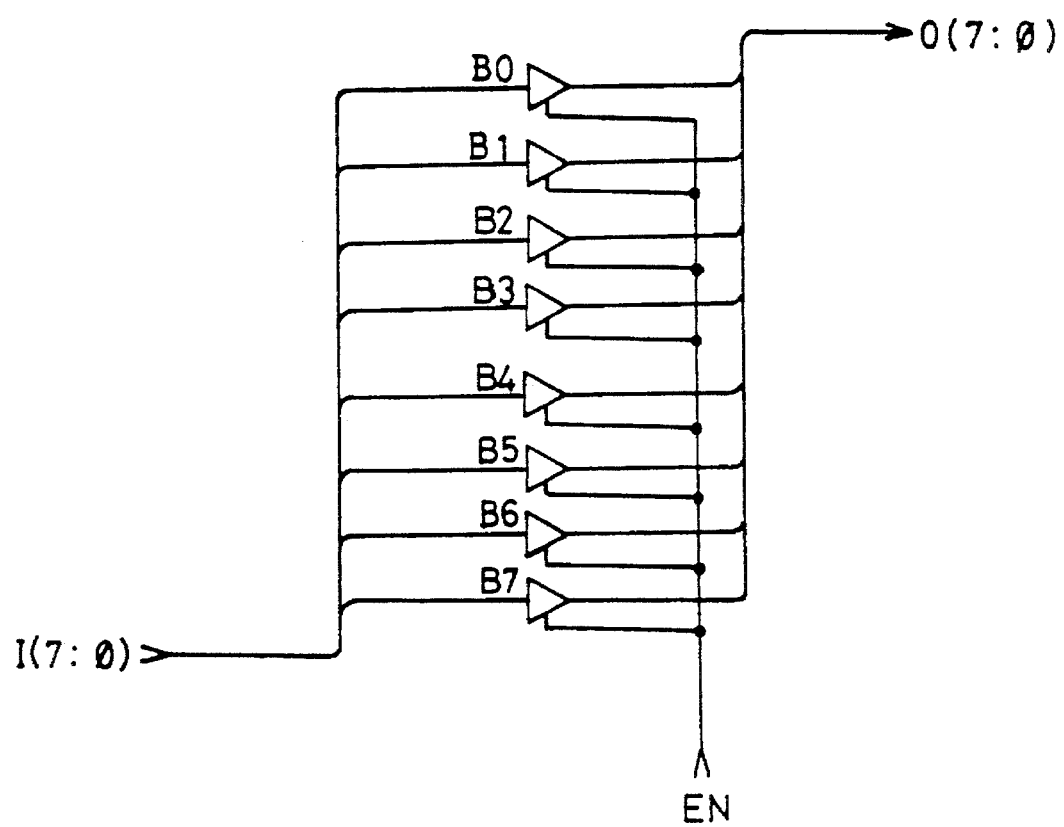
FIG. 3 is a detailed circuit diagram of the data switches employed in the bus interfacing circuit of FIG. 2.

The data switches 15, 16 and 17 have the same circuit architectures with each other as shown in FIG. 3, in which a plurality of buffers B0 to B7 are coupled in parallel between the input and output terminals I(7:0), O(7:0) and the respective enable terminals EN1 to EN3 are used as a common power supply terminal for activating the buffers B0 to B7 of the respective data switches 15,16 and 17.

After generating the host and peripheral write signals WRITE1, WRITE2 and the host and peripheral read signals READ1, READ2, the FIFO memory cell 13 is operated by the output signals generated from the OR logic gates 11 and 12. The sequence of the operation in the FIFO memory cell 13 is dependent upon the order of generation between the write signals WRITE1, WRITE2, which makes one of the direction signals HW1 and HW2 of the data propagation director 14 be "1" (depicted as a logic state of power supply voltage level) or "0" (depicted as a logic state of ground voltage level) alternatively.

Namely, if the host write and read signals WRITE1, READ1 are generated first, the host write and read signals are used as a write signal and a read signal respectively for controlling the data accessing in the FIFO memory cell 13. And the loop formed of the NOR logic gates NOR1, NOR2 stores the write signals WRITE1, WRITE2 and the NOR logic gates respectively generate "0" and "1" logic signals which are each applied to the inverter I1 and I2. Thus the direction signal HW1 that is the output signal of the inverter I1 becomes logical "1", as shown in FIG. 4E, and the direction signal HW2 which is the output signal of the inverter I2 becomes logical "0". Since the first data switch 15 is conductive while the third data switch 17 is nonconductive, the data applied to the host data input terminal HDI is transferred to the input terminal ID of the FIFO memory cell 13 and then stored therein. As the second data switch 16 now is made conductive by the read signal READ1 shown in FIG. 4B, during a read operation the data from the FIFO memory cell 13 is transferred to the data bus DB through the output terminal OD and the second data switch 16. The data writing period, as shown in FIG. 4F, is terminated when the peripheral write signal WRITE2 shown in FIG. 4C goes high, and the data reading period, as shown in FIG. 4G, is efficiently maintained while the host read signal READ1 shown in FIG. 4B is activated.

By the other hand, in the case of that the peripheral write signal WRITE2 is generated first, the peripheral write and read signals WRITE2, READ2 are used for operating the FIFO memory cell. The direction signals HW1 and HW2 become logical "0" and "1", respectively. The first and second data switches 15, 16 become nonconductive while the third data switch 17 becomes conductive. Thus, the data, shown in FIG. 4H, which is loaded on the data bus DB is applied to the input terminal ID of the FIFO memory cell 13 and stored therein. During a read operation, the data, shown in FIG. 4I, which is read from the FIFO memory cell 13 is transferred to the host data output terminal HDO through the output terminal OD.

As described above, the circuit relevant with the preferred embodiment can be free from the data bumping even when a FIFO memory is in need of performing a bilateral data accessing operation in an instant, and further offers the advantage that it is possible for the host and peripheral circuits to share one memory cell.

What is claimed is:

1. A bus interfacing circuit comprising:

a first OR-logic gate for operating upon a host write signal and a peripheral write signal applied thereto;

a second OR logic gate for operating upon a host read signal and a peripheral read signal applied thereto;

a first-in first-out memory cell for accessing data in response to output signals from said first and second OR logic gates;

a data propagation director for generating a first direction signal and a second direction signal in accordance with a generation order between said host and peripheral write signals;

a first data switch for transferring data fed in a host data input terminal to said first-in first-out memory cell in response to said first direction signal;

a second data switch for transferring data applied from said first-in first-out memory cell to a data bus in response to said host read signal; and a third data switch for transferring data loaded on said data bus to said first-in first-out memory cell.

2. A bus interfacing circuit according to claim 1, wherein said data propagation director includes first and second NOR logic gates respectively receiving said host write signal and said peripheral write signal and wherein respective rest input terminals and output terminals of said first and second NOR logic gates are coupled in crosswise fashion to each other.

\* \* \* \* \*